United States Patent
Bosch et al.

(10) Patent No.: US 8,131,501 B2
(45) Date of Patent: Mar. 6, 2012

(54) ANALYZING METHOD FOR A SENSOR SYSTEM DETERMINING THE POSITION OF A SHIFTING FORK IN A CHANGE GEAR TRANSMISSION

(75) Inventors: Helmuth Bosch, Leverkusen (DE); Dirk Nikolai, Bergisch Gladbach (DE)

(73) Assignee: Getrag Ford Transmissions GmbH, Cologne (DE)

(*) Notice: Subject to any disclaimer, the term of this patent is extended or adjusted under 35 U.S.C. 154(b) by 653 days.

(21) Appl. No.: 12/264,105

(22) Filed: Nov. 3, 2008

(65) Prior Publication Data

US 2009/0120160 A1 May 14, 2009

(30) Foreign Application Priority Data

Nov. 13, 2007 (DE) .......................... 10 2007 054 434

(51) Int. Cl.
*G01C 17/00* (2006.01)
*G06F 11/30* (2006.01)
(52) U.S. Cl. ......... 702/150; 702/182; 702/188; 702/189
(58) Field of Classification Search .......... 702/150–155, 702/182–189; 73/1.79
See application file for complete search history.

(56) References Cited

U.S. PATENT DOCUMENTS

| 6,182,518 | B1 * | 2/2001 | Baur ........................... 73/865.9 |
| 6,208,133 | B1 * | 3/2001 | Ehling et al. .................. 324/202 |

FOREIGN PATENT DOCUMENTS

| DE | 197 37 142 | | 3/1999 |
| DE | 19737142 | * | 3/1999 |
| DE | 199 47 008 | | 6/2000 |
| DE | 101 24 760 | | 2/2003 |
| DE | 10124760 | * | 2/2003 |
| DE | 10 2007 054 434 | | 2/2009 |

OTHER PUBLICATIONS

Notice of Allowance for DE 10 2007 054 434.2, German Patent and Trademark Office, Apr. 29, 2008.
English translation of p. 2 of the Notice of Allowance for DE 10 2007 054 434.2, German Patent and Trademark Office, Apr. 29, 2008.

* cited by examiner

*Primary Examiner* — Phuong Huynh
(74) *Attorney, Agent, or Firm* — Schlee IP International, P.C.; Alexander R. Schlee

(57) ABSTRACT

An analyzing method for a sensor system determining the position of a shifting fork in a shift transmission is suggested wherein a shifting fork can be moved from a neutral position into at least one gear position. The position of the shifting fork is determined by a sensor system comprising at least one magnet and at least one magnetic field sensor that can be moved relative to the magnet. The method includes storing a base diagram for a base output signal in relation to position s and correcting the measured output signal so that the base diagram can be used for determining with high accuracy the position of the shifting fork.

14 Claims, 5 Drawing Sheets

ANALYZING METHOD FOR A SENSOR SYSTEM DETERMINING THE POSITION OF A SHIFTING FORK IN A CHANGE GEAR TRANSMISSION

CROSS REFERENCE TO RELATED APPLICATION

This application claims the priority right from the German patent application DE 102007054434.2 that was filed on Nov. 13, 2007, the content of which is herewith incorporated in its entirety by reference.

BACKGROUND OF THE INVENTION

The invention relates to an analyzing method for a sensor system determining the position of a shifting fork in a change gear transmission.

In motor vehicles as a recent development automated shift transmissions are used in series. In these automated shift transmissions individual gears can be engaged for example by hydraulic or electric actuators. Typically, a gear is engaged by a shifting sleeve that correlates to the respective gear and is shifted in axial direction and thereby brought into positive interlocking with a loose wheel of the respective gear. The actuator is mechanically coupled with a shifting fork that is moved together with the shifting sleeve. The shifting fork can typically be moved from a neutral position into two opposite directions, namely one gear position in that one of the gears of the shift transmission is engaged and a further gear position in which another one of the gears of the shift transmission is engaged. For example, in a 7-gear-transmission the seven forward gears and the reverse gear can be engaged or disengaged by means of four shifting forks.

For controlling actuators for engaging and disengaging gears in the shift transmission it is necessary to determine the exact position of the respective shifting forks. From the prior art, respective sensor systems for determining the position are known. Among these sensor systems are also contactless sensor systems having a magnetic field sensor and a permanent magnet. For example, the magnetic field sensor in a shift transmission can be located at a fixed position, while the permanent magnet can be fixed to a movable shifting fork. The magnetic field sensor and permanent magnet are separated from each other by an air gap and are disposed with respect to each other such that the change of the position of the shifting fork moves the permanent magnet relative to the magnetic field sensor and therefore changes the magnetic field. The change in the magnetic field is detected by the magnetic field sensor so that the output signal changes. The output signal is finally analyzed for determining the position of the shifting fork.

In shift transmissions, due to production tolerances, air gaps of various sizes between the magnetic field sensor and the permanent magnet may result, influencing the level of the output signals of the magnetic field sensors. Further influencing parameters influencing the output signal are the magnetic flux strength of the magnet and the sensitivity of the magnetic field sensors, also due to production tolerances. In addition, further influencing parameters are present such as the temperature in the shift transmission and a possible deposition of chips at the magnet. The many influencing parameters make the detection of the position based on the output signal from the magnetic field sensors difficult.

The DE 101 24 760 A1 discloses a method for analyzing a sensor system comprising a magnetic field sensor and a permanent magnet. The DE 101 24 760 A1 suggests to analyze the non-linear output signal from the magnetic field sensors only over a certain operating range where the position change and the output signal correlate in a linear fashion with respect to each other. Further, according to the DE 101 24 760 A1 for a limited operating range by standardizing the output signals to a predetermined maximum signal deviation analyzing should be allowed that is allegedly independent from the temperature influences and the influence by the air gap.

In the DE 101 24 760 A1 a comparatively simple analysis is disclosed. The disadvantage is that the operating range is limited and for particular applications, for instance for determining the position of a shifting fork, can be too short. The DE 101 24 760 A1 suggests for enlarging the operating range to provide a plurality of the magnetic field sensors lined up in the direction of movement one after the other while the respective operating ranges of the individual magnetic field sensors overlap and therefore a larger overall operating range results. However, this increases the number of magnetic field sensors in the shift transmission and therefore costs.

SUMMARY OF THE INVENTION

It is an object of the invention to provide a method for analyzing sensor systems comprising a magnet and a magnetic field sensor by means of which the position of the shifting fork in a shift transmission can be determined easily and with sufficient accuracy.

In the method according to the present invention a base diagram for a base output signal $U_0$ is stored in a memory. This base diagram can for example be output signals of a sensor system having a median air gap between the magnetic field sensor and the magnet. Also for the base diagram relating to the magnetic field flux of the magnet and the sensitivity of the magnetic field sensor that is preferably designed as a Hall sensor a median, or expressed more generally, a chosen diagram is selected. Preferably, the output signal is an output voltage of the magnetic field sensor. The base diagram has preferably in the neutral position N a zero point, possible deviations or offsets (see below) are at first not considered.

In the method according to the present invention, further a boosting factor $V_{GP}$ in the gear position $s_{GP}$ is determined also in the position of the shifting fork in which a respective gear is engaged. The boosting factor $V_{GP}$ is the ratio between the base output signal $U_{0,GP}$ according to base diagram in that gear position and the generated output signal $U_{GP}$ in that gear position. The boosting factor $V_{GP}$ can be lower than 1, higher than 1, or in a particular case equal 1.

By means of the boosting factor $V_{GP}$ a function $F_V$ for the boosting factor V dependent on the position s is determined for the respective gear, assuming in the neutral position N of the shifting fork a starting value $V_N$ and in the gear position $s_{GP}$ the value of the boosting factor $V_{GP}$. Further, the method according to the present invention provides for determining the position s based on the output signal U, the function $F_V$ and the stored base diagram. Typically, a system of equations has to be solved that can be calculated quickly and without high efforts if the function $F_V$ for the boosting factor V has a simple structure. On the other hand, the function $F_V$ should reflect the relation between the base diagram and the generated output signals as precisely as possible.

The function $F_V$ can be a linear function depending on the position s such as described in the following equation for the function $F_{V1}$:

$$F_{V1} = C_1 s + V_{N1}$$

with
  $C_1$ gradient between the neutral position N and the gear position $s_{GP}$, wherein $C_1 = (V_{GP} - V_{N1})/s_{GP}$ with $s_N$ equaling 0 in the neutral position;
  $s_{GP}$ gear position, wherein the neutral position equals s=0;
  $V_{N1}$ boosting factor in neutral position A particularly advantageous compromise between calculating efforts and accuracy can be achieved if the function $F_V$ in form of the function $F_{V2}$ depends according to the following equation in a linear fashion on the output signal U:

$$F_{V2} = C_2 U + V_{N2}$$

with
  $C_2$ gradient between the neutral position N and the gear position, $C_2 = (V_{GP} - V_{N2})/U_{GP}$;
  U detected output signal depending on the position s; and
  $V_{N2}$ boosting factor in the neutral position.

with the definition that the boosting factor V is the ratio between the base output signal $U_0$ and the generated output signal U ($V = U_0/U$, wherein $V = F_V$) and by applying the function $F_{V2}$ for the base output signal $U_0$ according to the following equation:

$$U_0 = C_2 U^2 + U.$$

This means that in case of a predetermined gradient $C_2$ and a generated output signal U without big efforts the base output signal $U_0$ can be calculated. With this calculated value $U_0$ and by means of the base diagram the position s of the shifting fork is determined.

The starting values $V_{N1}$, $V_{N2}$ can both assume the value 1. This means that in the neutral position N no recalculation between the generated output signal and the base output signal is necessary.

Preferably, a zero point adjustment is conducted for correcting the measured output signal $U_{mess}$ from the magnetic field sensor by the signal offset A. The zero point adjustment is conducted without magnet. The following applies:

$$U = U_{mess} - A$$

with
  U generated output signal
  $U_{mess}$ measured output voltage
  A signal offset, $A = U_{ohneMagnet}$ in case of measuring without magnet.

Further, it may be the case that in the neutral position N between the magnet and the magnetic field sensor an offset B exists and results in that the generated output signal U does not assume the value zero in the neutral position. Therefore, a possible offset B can be determined and taken into consideration, wherein the following applies:

$$s + B = s_{real}$$

with
  s position of the shifting fork;
  B offset in neutral position between magnet and magnetic field sensor; and
  $s_{real}$ real position under taking the offset B into account.

The determination of the signal offset A, the determination of the offset B and/or the determination of the boosting factor $V_{GP}$ can be conducted when the shift gear transmission is operated for the first time. This achieves that the influences of the air gap, the magnetic flux strength of the magnets and/or the sensitivity of the magnetic field sensors are compensated or reflected. Preferably, determination of the values A, B and/or $V_{GP}$ are conducted under known or set operating parameters of the shift transmission (for example operating temperature).

During the driving operation in addition an adaption of the values A, B and/or $V_{GP}$ close in time can be conducted. This can in particular eliminate the influences of temperature and of possible metal chips that might deposit at the magnet.

The determination of the values A, B and/or $V_{GP}$ can be conducted for each gear separately. For example, the determined values for the first gear of the shift transmission can deviate from the values for the second gear.

BRIEF DESCRIPTION OF THE DRAWINGS

By referring to the embodiments shown in the drawings the invention is in the following discussed in more detail. In the figures show.

DETAILED DESCRIPTION OF THE DRAWINGS

Figure 1:
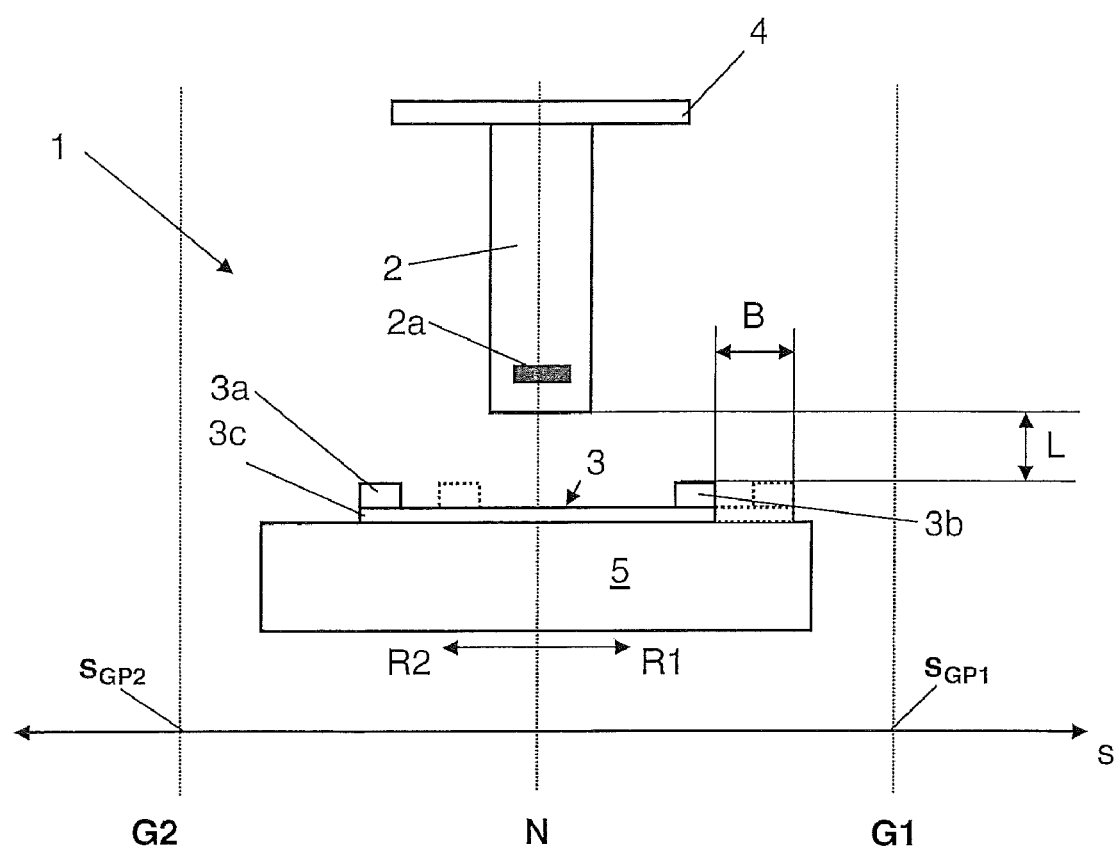
FIG. 1 a schematic assembly of a sensor system.

FIG. 1 shows schematically the structure of a sensor system comprising a magnetic field sensor with a Hall element 2a and a rod-shaped magnet 3 with two magnet poles 3a, 3b and a pole metal sheet 3c. While the magnetic field sensor 2 is fixed at a particular location in a shift transmission, wherein the FIG. 1 only shows part of the transmission housing 4, the magnet 3 is fixed to a shifting fork 5 that has been shown schematically and only partially in the drawings. The shifting fork 5 can be moved into the directions R1, R2 in relation to the transmission housing by means of at least one actuator (not shown).

Between the magnetic field sensor 2 and the magnet 3 an air gap L is provided having a width of several millimeters.

FIG. 1 shows the shifting fork 5 in a neutral position (see dotted line). Ideally, magnet 3 and magnetic field sensors 2 are located centrally with respect to each other such as shown in FIG. 1. By means of a dotted line a further position of the magnet is shown that would result in an offset B between the magnet and the magnetic field sensor. The offset B can be determined and be taken into consideration as described later in this application.

Starting from this neutral position N the shifting fork 5 can be moved in a direction R1 to the right according to the drawing shown as FIG. 1 for engaging a gear G1. When the gear G1 has been engaged, the shifting fork 5 has traveled from the neutral position for a distance $s_{GP1}$. This traveled distance correlates to a position $s_{GP1}$ of the shifting fork 5 as far as the neutral position is viewed as a the zero point. In analogy, the same applies for the opposite direction R2 that is opposite to the direction R1. In case of a movement in direction R2 by the amount $s_{GP2}$ the gear G2 is engaged.

It has to be taken into consideration that FIG. 1 only shows a schematic drawing. The proportions between the air gap L, the offset B and of the dimensions of the magnet 3 are not to scale.

Figure 2:
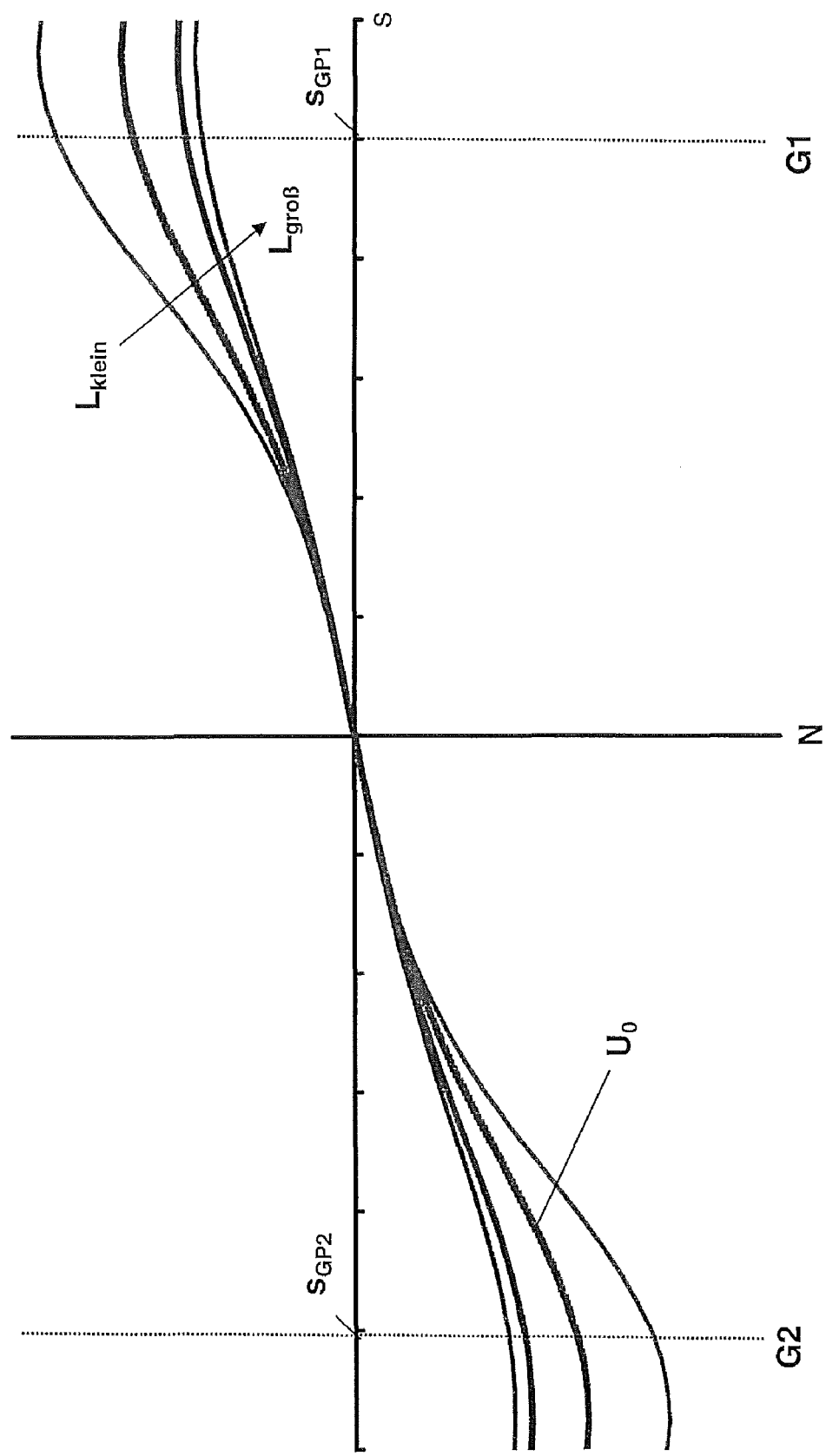
FIG. 2 a diagram reflecting for air gaps of various sizes the relation between the output signal and position.

The FIG. 2 shows an output signal U in the form of an output voltage of the sensor system 1 depending on the position s of the shifting fork 5 for a variety of air gaps L of four different widths. The bigger the air gap L, the less inclined the graph for the output voltage U. For example, the graph denoted $U_0$ can show a graph of a base output signal according to a base diagram that has been stored according to the method according to present invention as the basis for determining the position s.

In the neutral position the symmetrical output voltage U equals 0. Close to the neutral position the influence of the air gap L can be neglected while in the gear positions $s_{GP1}$ and $s_{GP2}$ it is clearly noticeable. In analogy, this applies also to the influence by the temperature: close to the neutral position the influence from the temperature on the output signal is very little while it becomes more and more apparent at bigger distances from the neutral position N. At a certain distance from the neutral position N, the output signal is clearly non-linear.

Figure 3:
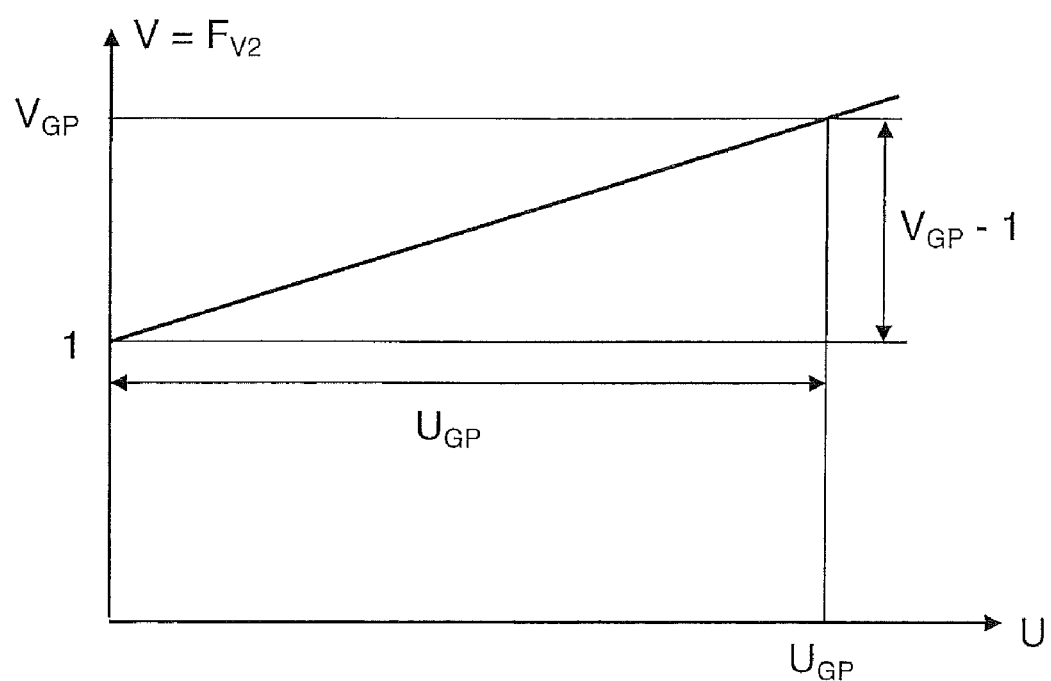
FIG. 3 a function according to the present invention for a boosting factor depending on the output signal.

FIG. 3 shows an approach for a preferred simplification of the correlation between the generated output voltage U and the boosting factor V. By means of the boosting factor V it is tried to determine, starting from a measured output signal U for a particular setting in relation to the air gap, temperature and other influencing parameters the output signal $U_0$ by means of the base diagram and then the position s that corresponds to the measured output signal U.

The correlation as shown in FIG. 3 shows a linear function $F_{V2}$ with a gradient $C_2$ over a coordinate range 1. The gradient $C_2$ is set such that the function $F_{V2}$ in the gear position $s_{GP}$ assumes a value of a new boosting factor $V_{GP}$ in this gear position $s_{GP}$. The following applies:

$$V = U_0/U \text{ and } V_{GP} = U_{0,GP}/U_{GP}$$

$$F_{V2} = C_2 U + 1$$

$$C_2 = (V_{GP} - 1)/U_{GP}$$

with
V Boosting factor
$V_{GP}$ boosting factor in the gear position $s_{GP}$
$U_0$ output signal according to base diagram
$U_{0,GP}$ output signal according to base diagram in the gear position $s_{GP}$
U generated output signal
$U_{GP}$ generated output signal in the gear position $s_{GP}$; and
$C_2$ gradient of the function $F_{V2}$ From the three equations above the function of the generated output signal U depending on the base output signal $U_0$ according to the base diagram can be calculated:

$$U_0 = C_2 U^2 + U.$$

This function allows without major calculation efforts under knowledge of the gradient $C_2$ to reduce the generated output signal U to the base output signal $U_0$ and then to determine based on the base diagram the position s.

Figure 4:
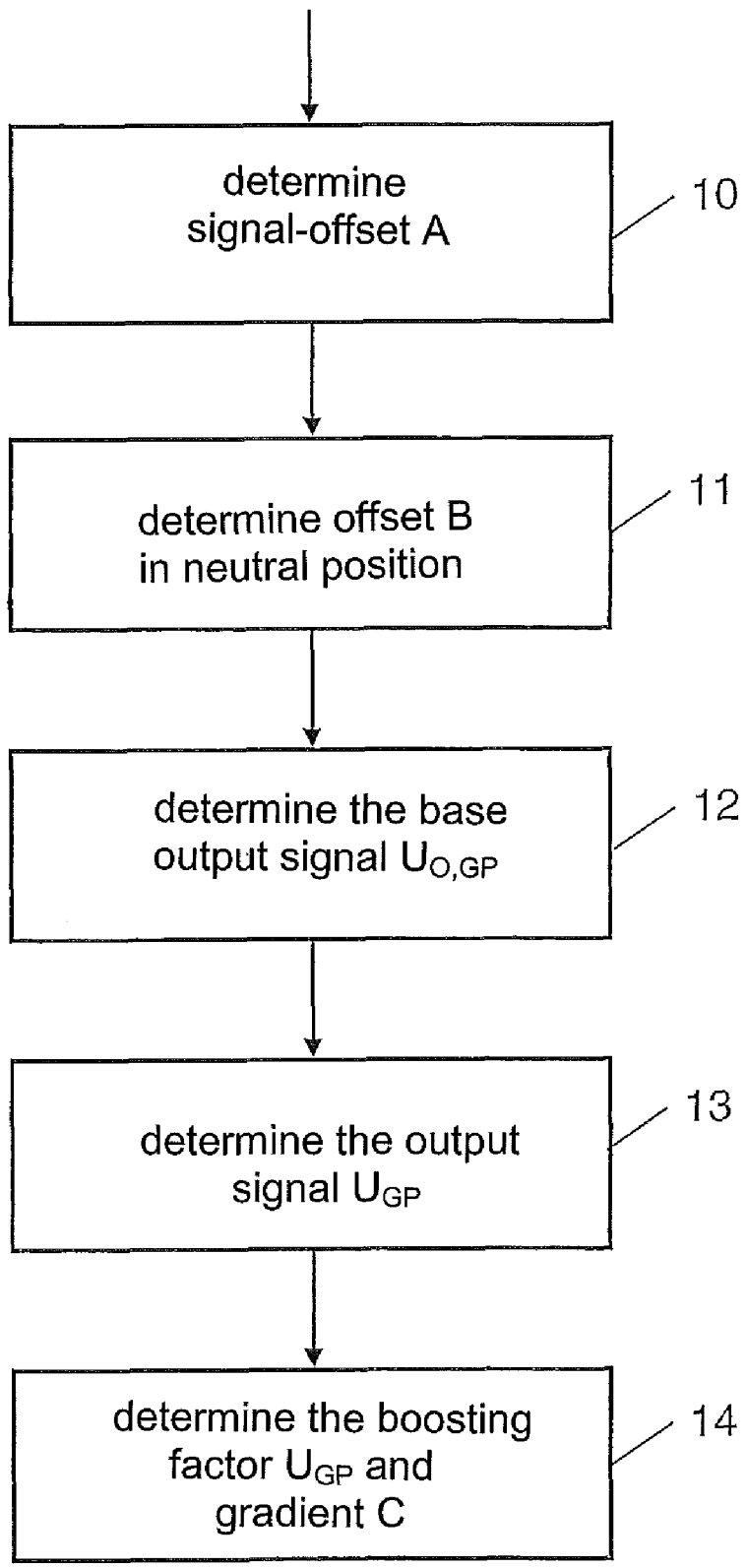
FIG. 4 a flow diagram for determining the function of the boosting factor.

FIG. 4 shows a flow diagram for determining the boosting factor $V_{GP}$ and the gradient $C_2$, or as expressed in more general terms, the gradient C. At first in a first step a signal offset A is determined. This signal offset A is determined without magnet 3. By means of the signal offset A the measured output signal $U_{mess}$ can be adjusted.

In step 11 the offset B is determined as it has already been described in connection with FIG. 1. In step 12 the base output signal $U_{0,GP}$ is determined that relates to the gear position $s_{GP}$ according to the base diagram. In the following step 13 the output signal $U_{GP}$ in the gear position $s_{GP}$ is determined and in step 14 the values $V_{GP}$ and C are determined for instance by means of the above mentioned equations.

Figure 5:
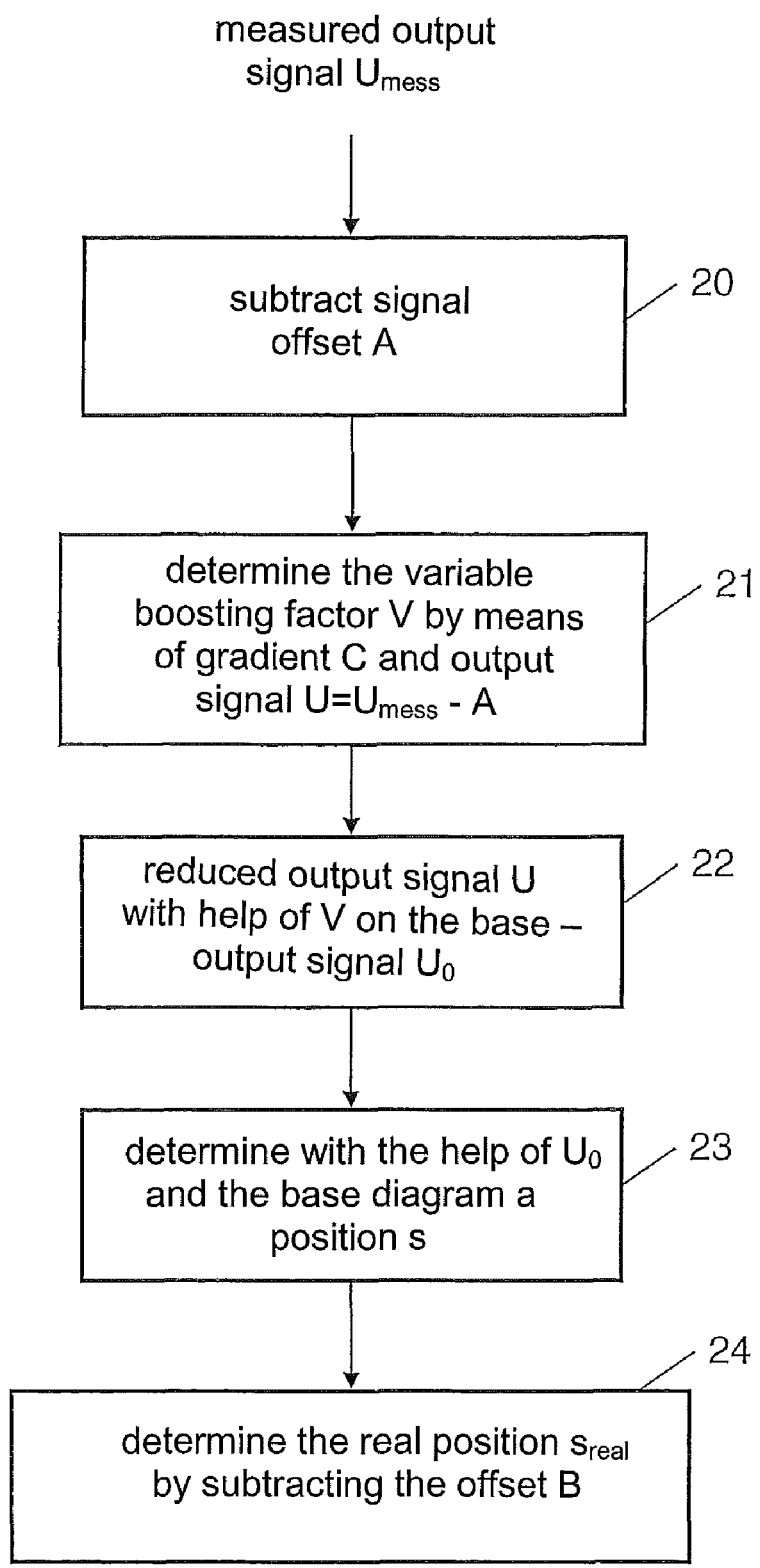
FIG. 5 a flow diagram for determining the position of a shifting fork by means of the function of the boosting factor.

FIG. 5 shows a flow diagram for deriving from the measured output signal $U_{mess}$ the real shifting path or the real position $s_{real}$. In step 20 the afore determined signal offset A from the measured output signal $U_{mess}$ is subtracted.

This obtains the (adjusted) output signal U. This output signal U can, as described above in connection with FIG. 3, be recalculated into a base output signal $U_0$ (steps 21 and 22). The result from steps 21 and 22 is a particular base output signal $U_0$ that, according to the base diagram, relates to a position s of the shifting fork 5 (step 23). If an offset B exists, it is taken into consideration in step 24 and the real position $s_{real}$ is determined taking the offset B into consideration. When the real position $s_{real}$ has been determined, the method is concluded.

The invention claimed is:

1. In a change gear transmission, a method for determining a position s of a shifting fork, wherein the shifting fork can be moved from a neutral position N into at least one gear position $s_{GP}$ and wherein a sensor system generates an output signal U correlating to the position s, wherein the sensor system comprises at least one magnet and at least one magnetic field sensor that can be moved relative to the magnet, the method comprising:
    a. Storing a base diagram for a base output signal $U_0$ as an indicative value for the position s of the shifting fork;
    b. Determining a boosting factor $V_{GP}$ in the gear position $s_{GP}$ as a ratio between a base output signal $U_{0,GP}$ indicative for the at least one gear position $s_{GP}$ and determined from the base diagram and an actual generated output signal $U_{GP}$ that is indicative for the gear position $s_{GP}$;
    c. Determining a function $F_V$ for a boosting factor V depending on the position s, wherein a starting value $V_N$ of the boosting factor V is assumed in the neutral position N, and a gear position value $V_{GP}$ of the boosting factor V is assumed in the at least one gear position $S_{GP}$;
    d. Determining, by the sensor system, the position s of the shifting fork based on the output signal U, the function $F_V$ and the stored base diagram.

2. Method according to claim 1, wherein the function $F_V$ is determined as $F_{V1}$ by the following correlation:

$$F_{V1} = C_1 s + V_{N1}$$

with
$C_1$ gradient between the neutral position N and the gear position $s_{GP}$, $$C_1 = (V_{GP} - V_{N1})/s_{GP}$$

$s_{GP}$ gear position; and
$V_{N1}$ boosting factor in the neutral position.

3. Method according to claim 1, wherein the function $F_V$ is determined as $F_{V2}$ by the following correlation:

$$F_{V2} = C_2 U + V_{N2}$$

with
$C_2$ gradient between the neutral position N and the gear position, $$C_2 = (V_{GP} - V_{N2})/U_{GP}; \text{ and}$$

U detected output signal depending on the position s; and
$V_{N2}$ boosting factor in the neutral position.

4. Method according to claim 2, wherein $V_{N1}$ correlates to the value 1.

5. Method according to claim 3, wherein $V_{N2}$ correlates to the value 1.

6. Method according to claim 1, further comprising the method step of conducting a zero point adjustment of the magnetic field sensor without a magnet, wherein the following applies:

$$U=U_{mess}-A$$

with $U_{mess}$ measured output voltage; and

A signal offset, $A=U_{ohneMagnet}$ in case of measuring without magnet.

7. Method according to claim 1, further comprising the method step of determining a possible offset between the magnet and the magnetic field sensor in the neutral position N wherein the following applies:

$$s+B=s_{real}$$

with s position of the shifting fork;

B offset in neutral position between magnet and magnetic field sensor; and $S_{real}$ real position under taking the offset B into account.

8. Method according to claim 1, wherein the gear position value $V_{GP}$ of the boosting factor V is determined when the shift gear transmission is operated for the first time.

9. Method according to claim 6, wherein the signal offset A is determined when the shift gear transmission is operated for the first time.

10. Method according to claim 7, wherein the offset B is determined when the shift gear transmission is operated for the first time.

11. Method according to claim 1, wherein the gear position value $V_{GP}$ of the boosting factor V is determined during the driving operation of the shift gear transmission.

12. Method according to claim 6, wherein the signal offset A is determined during the driving operation of the shift gear transmission.

13. Method according to claim 7, wherein the offset B is determined during the driving operation of the shift gear transmission.

14. Method according to claim 1, wherein the determination of the gear position value $V_{GP}$ of the boosting factor V is conducted for each gear of the shift transmission separately.

* * * * *